United States Patent
Chug et al.

(10) Patent No.: US 10,841,412 B2
(45) Date of Patent: Nov. 17, 2020

(54) METHOD AND APPARATUS FOR ENABLING CONTEXT-BASED VOICE RESPONSES TO ALWAYS-ON-DISPLAY NOTIFICATIONS

(71) Applicant: Motorola Mobility LLC, Chicago, IL (US)

(72) Inventors: Himanshu Chug, Bangalore (IN); Amit Kumar Agrawal, Bangalore (IN); Satyabrata Rout, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/457,784

(22) Filed: Mar. 13, 2017

(65) Prior Publication Data

US 2018/0262607 A1   Sep. 13, 2018

(51) Int. Cl.
*H04M 1/725* (2006.01)

(52) U.S. Cl.
CPC .... *H04M 1/72519* (2013.01); *H04M 2201/38* (2013.01); *H04M 2201/41* (2013.01); *H04M 2203/6018* (2013.01); *H04M 2203/6054* (2013.01); *H04M 2250/74* (2013.01)

(58) Field of Classification Search
CPC ......... H04M 1/72519; H04M 2201/38; H04M 2201/41; H04M 2203/6018; H04M 2203/6054; H04M 2250/74
USPC ...................................................... 455/563
See application file for complete search history.

(56) References Cited

U.S. PATENT DOCUMENTS

| | | | |
|---|---|---|---|
| 8,543,834 B1 * | 9/2013 | Barra | G06F 21/32 713/182 |
| 2013/0085761 A1 * | 4/2013 | Bringert | G06F 3/167 704/275 |
| 2014/0337028 A1 * | 11/2014 | Wang | H04M 1/6075 704/251 |
| 2015/0082446 A1 * | 3/2015 | Flowers | G06F 3/0488 726/26 |
| 2016/0119338 A1 * | 4/2016 | Cheyer | G06F 21/32 726/4 |
| 2016/0365101 A1 | 12/2016 | Foy et al. | |
| 2017/0287491 A1 * | 10/2017 | Yao | G10L 17/22 |
| 2017/0346872 A1 * | 11/2017 | Naik | H04L 65/604 |

(Continued)

OTHER PUBLICATIONS

Google, "Use Voice Access Commands", https://support.google.com/accessibility/android/answer/6151854?hl=en, known about as early as Sep. 15, 2016, downloaded on Jun. 13, 2017.

(Continued)

*Primary Examiner* — Yuwen Pan
*Assistant Examiner* — Angelica M Perez
(74) *Attorney, Agent, or Firm* — Kunzler Bean & Adamson

(57) ABSTRACT

For responding to a notification displayed in an Always on Display ("AoD") mode with a voice command, a method displays notifications in at least one of a full power mode or an AoD mode, parses a notification to determine a notification type. The method also determines, while in the AoD mode, if the notification supports voice responses. If the notification supports voice response, the method receives a voice command from a user and authorizes the user based on the voice command, bypasses a screen lock, in response to the user being authorized, and executes the voice command.

10 Claims, 7 Drawing Sheets

(56) References Cited

U.S. PATENT DOCUMENTS

2018/0082684 A1* 3/2018 Gunn .................. G10L 15/22
2018/0182390 A1* 6/2018 Hughes ................ G10L 15/02
2018/0247065 A1* 8/2018 Rhee .................. G07C 9/257

OTHER PUBLICATIONS

Wikipedia "Always on Display", https://en.wikipedia.org/wiki/Always_on_Display, last updated on Sep. 3, 2018, p. 1.

* cited by examiner

METHOD AND APPARATUS FOR ENABLING CONTEXT-BASED VOICE RESPONSES TO ALWAYS-ON-DISPLAY NOTIFICATIONS

FIELD

The subject matter disclosed herein relates to user interaction with an electronic device.

BACKGROUND

Description of the Related Art

Electronic devices can provide notifications for various events in which a user is interested. Additionally, some electronic devices are capable of presenting notifications in a high-power mode (e.g., utilizing all resources and screen capabilities of the electronic device) and a low-power mode (i.e., the application processor of the electronic device is powered-down and a partial display technology is implemented for low power usage). Typically, the electronic device prompts the user with a notification in the low-power mode and continues with the notification (e.g., blinking LED) until the user either dismisses the notification or authenticates (e.g., pin code, fingerprint scan, password, pattern code, etc.) his or herself to enter the high-power mode and respond to the notification. However, the constant barrage of notifications, and the requirement to authenticate oneself cause the user to waste time, and becomes cognitively draining to the user. It would be beneficial to provide an improved method of responding to these notifications in the low-power mode, and improved electronic devices configured to perform such methods could be developed.

BRIEF SUMMARY

An apparatus for managing context-based voice responses in an Always on Display ("AoD") environment is disclosed. A method and program product also perform the functions of the apparatus.

The apparatus includes a display configured to operate in at least one of a full power mode or an Always on Display ("AoD") mode, a processor, and a memory that stores code executable by the processor while the display is operating in the AoD mode. The executable code causes the processor to parse a notification to determine a notification type, and determine if the notification supports voice responses. The executable code also causes the processor to receive a voice command from a user and authorize the user based on the voice command, and bypass a screen lock, in response to the user being authorized, and execute the voice command.

In one embodiment, the executable code also causes the processor to perform actions including displaying a notification to the user via the display, and enabling a voice input that receives the voice command from the user after the user acknowledges the notification. The actions may also include enabling the voice input following a delay from a time that the user acknowledges the notification. The delay may be based on a quantity of text corresponding to the notification.

In another embodiment, the actions include presenting voice-command suggestions in response to the determined notification type, executing the voice command in the full power mode, and returning the display to the AoD mode following the execution of the voice command.

A method for managing context-based voice responses in an AoD environment may include displaying notifications in at least one of a full power mode or an Always on Display ("AoD") mode, parsing a notification to determine a notification type, and determining, while in the AoD mode, if the notification supports voice responses. The method may also include receiving a voice command from a user and authorizing the user based on the voice command, and bypassing a screen lock, in response to the user being authorized, and executing the voice command.

In one embodiment, the method also includes enabling a voice input that receives the voice command from the user after the user acknowledges the notification, and enabling the voice input following a delay from a time that the user acknowledges the notification. The delay may be determined according to a length of text associated with the notification.

In another embodiment, the method includes presenting voice-command suggestions in response to the determined notification type, executing the voice command in the full power mode, and returning the display to the AoD mode following the execution of the voice command.

A program product for managing context-based notifications in an AoD mode is also provided. The program product code comprises a computer readable storage medium that stores instructions that, when executed by a processor of a computing device, cause the computing device to perform the actions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
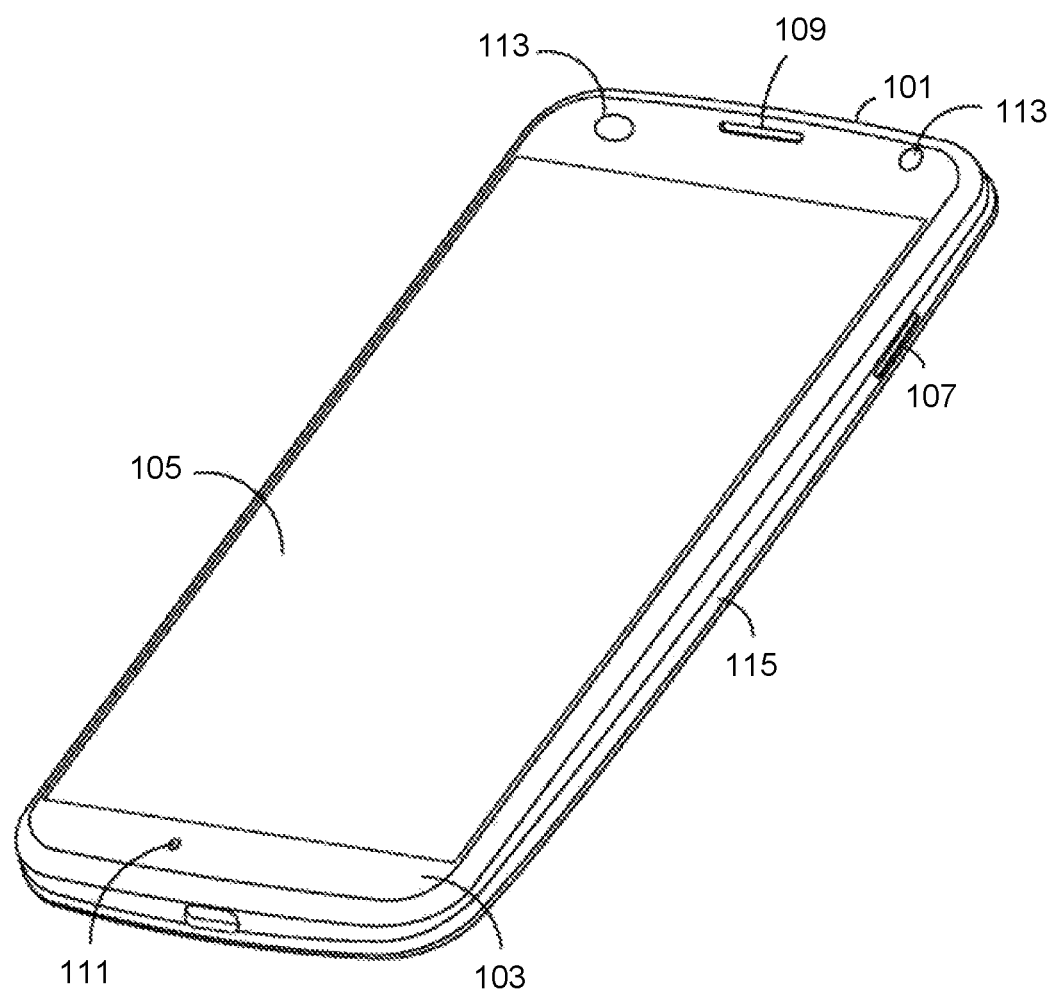
FIG. 1 is a perspective view of an example electronic device in accordance with embodiments of the present disclosure.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices can be tangible, non-transitory, and/or non-transmission. The storage devices do not embody signals. In a certain embodiment, the storage devices only employ signals for accessing code.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a perspective view of an example electronic device 100 in accordance with embodiments of the present disclosure. In the present embodiment, the electronic device 100 can be any type of device capable of providing touch screen interactive capabilities. Examples of the electronic device 100 include, but are not limited to, mobile devices, wireless devices, smart phones, tablet computing devices, personal digital assistants, personal navigation devices, touch screen input devices, touch or pen-based input devices, portable video or audio players, as well as any of a variety of other electronic devices. It is to be understood that the electronic device 100 may take the form of a variety of form factors, such as, but not limited to, bar, tablet, flip/clam/fold, slider and rotator form factors.

In the present example embodiment shown in FIG. 1, the electronic device 100 has a housing 101 comprising a front surface 103, which includes a touch screen display 105 that, together with certain other features discussed below, constitutes a user interface. In the present example, the touch screen display 105 is a touch screen including a touch-sensitive surface that overlays a display surface forming part of (or that is positioned just underneath or inwardly of) the front surface 103. In one embodiment, the touch screen display 105 (and particularly the display surface thereof) employs organic light-emitting diode (OLED) technology. Further, the user interface of the electronic device 100 as shown can also include one or more input keys 107. Examples of the input key or keys 107 include, but are not limited to, keys of an alpha or numeric (e.g., alphanumeric) keypad (or other keyboard), physical keys, touch-sensitive surfaces, mechanical surfaces, multipoint directional keys, and side buttons or keys. Additionally, the electronic device 100 can also comprise a speaker 109 and microphone 111 for audio output and input, respectively, along the front surface 103 (or other outer surfaces of the device). Indeed, although FIG. 1 shows one example display and user interface features, it is to be understood that the electronic device 100 can include a variety of other combinations of display and user interface features depending upon the embodiment.

Additionally, as shown in FIG. 1, the electronic device 100 includes one or more sensors 113, a number of which are shown to be positioned at or within an exterior boundary of the housing 101 (and can be supported on or within the housing 101). More particularly, as illustrated by FIG. 1, in the present embodiment the sensor or sensors 113 can be positioned at the front surface 103, another surface (such as one or more side surfaces 115) of the exterior boundary of the housing 101, or both. In the present embodiment, at least some of the sensors 113 (whether at the exterior boundary or within the exterior boundary, i.e., internal to the housing) are configured to detect one or more predetermined environmental conditions associated with an environment external or internal to the housing. Further examples of the sensors 113 are described below in reference to FIG. 2.

Figure 2:
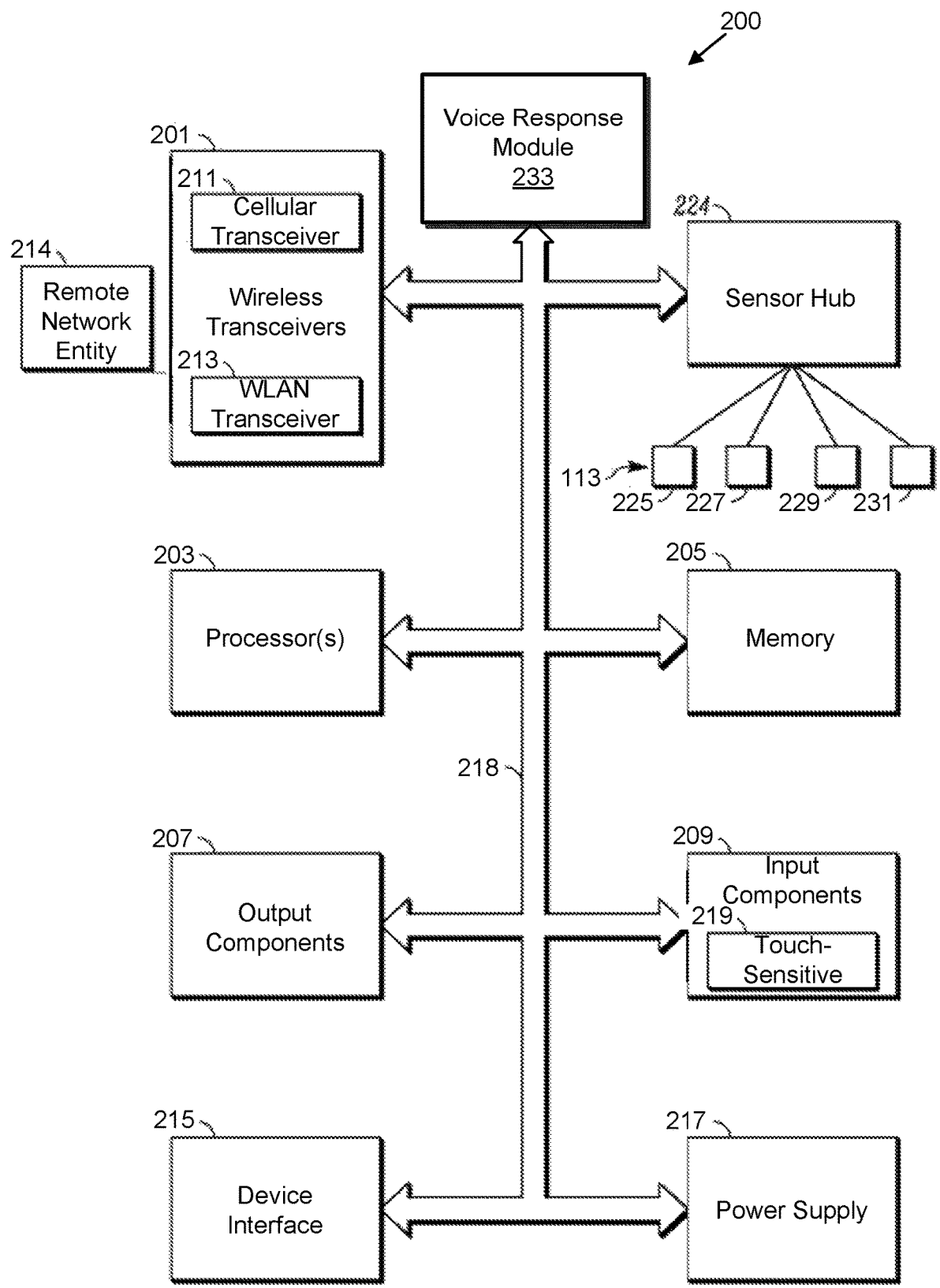
FIG. 2 is a schematic block diagram representing example components (e.g., internal components) of the electronic device of FIG. 1.

FIG. 2 is a schematic block diagram representing example components (e.g., internal components) 200 of the electronic device 100 of FIG. 1. In the depicted embodiment, the components 200 include one or more wireless transceivers 201, one or more processors 203, one or more memories 205, one or more output components 207, and one or more input components 209. As already noted above, the electronic device 100 includes a user interface, including the touch screen display 105 that comprises one or more of the output components 207 and one or more of the input components 209. Additionally, the electronic device 100 includes a plurality of the sensors 113, several of which are described in more detail below. In one embodiment, the sensors 113 are in communication with (so as to provide sensor signals to or receive control signals from) a sensor hub 224.

In one embodiment, the components 200 include a device interface 215 to provide a direct connection to auxiliary components or accessories for additional or enhanced functionality. In addition, the internal components 200 include a power source or supply 217, such as a portable battery, for providing power to the other internal components and allow portability of the electronic device 100. As shown, all of the components 200, and particularly the wireless transceivers 201, processors 203, memories 205, output components 207, input components 209, sensor hub 224, device interface 215, and power supply 217, are coupled directly or indirectly with one another by way of one or more internal communication link(s) 218 (e.g., an internal communications bus).

In a further embodiment, the wireless transceivers 201 include a cellular transceiver 211 and a Wi-Fi transceiver 213. In alternative embodiments, the wireless transceivers are intended to encompass numerous embodiments in which any arbitrary number of (e.g., more than two) wireless transceivers employing any arbitrary number of (e.g., two or more) communication technologies are present.

Exemplary operation of the wireless transceivers 201 in conjunction with others of the components 200 of the electronic device 100 can take a variety of forms and can include, for example, operation in which, upon reception of wireless signals (as provided, for example, by remote device (s)), the internal components detect communication signals and the transceivers 201 demodulate the communication signals to recover incoming information, such as voice or data, transmitted by the wireless signals. After receiving the incoming information from the transceivers 201, the processors 203 format the incoming information for the one or more output components 207.

Likewise, for transmission of wireless signals, the processors 203 format outgoing information, which can but need not be activated by the input components 209, and conveys the outgoing information to one or more of the wireless transceivers 201 for modulation to provide modulated communication signals to be transmitted. The wireless transceiver(s) 201 convey the modulated communication signals by way of wireless (as well as possibly wired) communication links to other devices (e.g., remote devices). The wireless transceivers 201 in one example allow the electronic device 100 to exchange messages with remote devices, for example, a remote network entity 214 of a cellular network or WLAN network. Examples of the remote network entity 214 include an application server, web server, database server, content server, SMS server, or other network entity accessible through the wireless transceivers 201 either directly or indirectly via one or more intermediate devices or networks (e.g., via a WLAN access point, the Internet, LTE network, or other network).

Depending upon the embodiment, the output and input components 207, 209 of the components 200 can include a variety of visual, audio, or mechanical outputs. For example, the output device(s) 207 can include one or more visual output devices such as a cathode ray tube, liquid crystal display, plasma display, video screen, incandescent light, fluorescent light, front or rear projection display, and light emitting diode indicator, one or more audio output devices such as a speaker, alarm, or buzzer, or one or more mechanical output devices such as a vibrating mechanism or motion-based mechanism. Likewise, by example, the input device(s) 209 can include one or more visual input devices such as an optical sensor (for example, a camera lens and photo sensor), one or more audio input devices such as a microphone, and one or more mechanical input devices such as a flip sensor, keyboard, keypad, selection button, navigation cluster, touch pad, capacitive sensor, motion sensor, and switch.

As noted, the user interface and particularly the touch screen display 105 of the electronic device 100 of FIG. 1 can be considered to constitute or include both one and more of the input components 209, particularly a touch-sensitive input component 219 shown in FIG. 2, and one or more of the output components 207. Further, it should be appreciated that the operations that can actuate one or more of the input devices 209 can include not only the physical pressing/activating of the touch screen display 105 or buttons or other actuators of the user interface or otherwise, but can also include, for example, opening the electronic device 100 (if it can take on open or closed positions), unlocking the electronic device 100, moving the electronic device to actuate a motion, moving the electronic device to actuate a location positioning system, and operating the electronic device.

In one embodiment, one or more of the input components 209, such as one or more input components encompassed by the user interface such as the touch-sensitive component 219 shown in FIG. 1, can produce an input signal in response to detecting a predetermined gesture. In this regard, the touch-sensitive component 219 can be considered a gesture sensor and can be or include, for example, a touch-sensitive sensor having a touch-sensitive surface substantially parallel to the display. The touch-sensitive sensor can include at least one of a capacitive touch sensor, a resistive touch sensor, an acoustic sensor, an ultrasonic sensor, a proximity sensor, or an optical sensor.

In one embodiment, the components 200 also can include one or more of various types of the sensors 113. Although the sensors 113 are, for the purposes of FIG. 2, shown to be distinct from the input devices 209, the sensors can also be considered as being encompassed among the input devices 209. In alternate embodiments, one or more of the input devices can be encompassed among the sensors, one or more of the sensors can be considered distinct from the input devices, one or more of the input devices can be considered distinct from the sensors, or all of the sensors can be considered distinct from all of the input devices and vice-versa.

With respect to the sensors 113, these particularly include various sensors 225 through 231 that are examples of sensors that can be included or utilized by the electronic device 100. As already noted, as shown in FIG. 2, the various sensors 225-231 in the present embodiment can be controlled by the sensor hub 224, which can operate in response to or independent of the processor(s) 203. The various sensors 225 through 231 can include, but are not limited to, one or more power sensors 225, one or more temperature sensors 227, one or more pressure sensors 228, one or more moisture sensors 229, and one or more ambient noise sensors 231.

Although the various sensors 225 through 231 are shown in FIG. 2, in other embodiments one or more of numerous other types of sensors can also be included among the sensors 113 including, for example, one or more motion sensors, including for example one or more accelerometers or Gyro sensors (not shown), one or more light sensors, one or more proximity sensors (e.g., a light detecting sensor, an ultrasound transceiver or an infrared transceiver), one or more other touch sensors, one or more altitude sensors, one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the electronic device 100.

With respect to the processor(s) 203, the processor(s) can include any one or more processing or control devices such as, for example, a microprocessor, microcomputer, application-specific integrated circuit, etc. The processors 203 can generate commands, for example, based on information received from the one or more input components 209. The processor(s) 203 can process the received information alone or in combination with other data, such as information stored in the memories 205. Thus, the memories 205 of the components 200 can be used by the processors 203 to store and retrieve data.

Further, the memories (or memory portions) 205 of the components 200 can encompass one or more memory devices of any of a variety of forms (e.g., read-only memory, random access memory, static random access memory, dynamic random access memory, etc.), and can be used by the processors 203 to store and retrieve data. In some embodiments, one or more of the memories 205 can be integrated with one or more of the processors 203 in a single device (e.g., a processing device including memory or processor-in-memory (PIM)), albeit such a single device will still typically have distinct portions/sections that perform the different processing and memory functions and that can be considered separate devices. The data that is stored by the memories 205 can include, but need not be limited to, operating systems, applications, and informational data.

Each operating system includes executable code that controls basic functions of the electronic device 100, such as interaction among the various components included among the components 200, communication with external devices or networks via the wireless transceivers 201 or the device interface 215, and storage and retrieval of applications, modules, and data, to and from the memories 205. Each application (or module) includes executable code that utilizes an operating system to provide more specific functionality, such as file system service and handling of protected and unprotected data stored in the memories 205. Such operating system or application information can include software update information (which can be understood to potentially encompass updates to either application(s) or operating system(s) or both). As for informational data, this is typically non-executable code or information that can be referenced or manipulated by an operating system or application for performing functions of the electronic device 100.

The electronic device 100 in one embodiment is configured to proceed among different operational modes or states, mainly, a "fully awake" or "on" mode of operation during which the processors 203 are operating (that is, the application processors are up and running), an "off" mode of operation, and an "intermediate" mode of operation during which "breathing" and "peeking" processes occur or can occur. Although in the present embodiment the processors 203 are off or powered-down during the off mode and intermediate mode of operation (by contrast to operation in the fully awake mode, during which the processors 203 are up and running), it is still possible for the electronic device 100 to operate during one or both of the off mode and intermediate mode in manners that involve some display functionality by the touch screen display 105 (including potentially both outputting of information and receiving of inputs). Such operation of the touch screen display 105 during the intermediate mode or off mode is achieved by virtue of control functionality provided by the sensor hub 224.

It should further be appreciated that, generally speaking, operation in the fully awake mode is associated with a normal power mode of the processors 203 (application processors) or a substantially active mode of those processors. By contrast, the intermediate mode of operation and off mode of operation are associated with a low power (or even completed powered-off) mode of the processors 203 (application processors) or a substantially inactive mode of those processors. The intermediate mode of operation can also be referred to as an "Always on Display" mode (AoD mode), "doze" mode, or "sleep" mode (or the off mode potentially can also be encompassed generally within the "sleep" mode), or lower-power mode of operation, in contrast to the fully awake mode, which can be referred to as a "non-sleep" mode or higher-power mode of operation.

Additionally as will be described further below, in at least some embodiments disclosed herein, one or more notifications can be displayed by the electronic device 100 in a "non-sleep" mode such as the fully awake mode and also one or more notifications can be displayed by the electronic device in a "sleep" mode such as the intermediate or AoD mode (including sub mode portions thereof as described). In at least some such embodiments, the notifications provided in the fully awake mode or "non-sleep" mode are notifications received during operation in that mode, and that are displayed by way of activation of the entire, or substantially the entire, display screen (e.g., full screen information is displayed, where the full screen information includes data corresponding to substantially all pixels capable of being displayed by the display). Further in such embodiments, in contrast, the notifications provided in the intermediate mode or AoD mode are notifications received during operation in that mode, and that are displayed by way of activation of only a portion or portions of the display screen (particularly portion(s) that are substantially less than the entire display screen or display substantially less that the full screen information, that is, information corresponding to less or substantially less than all pixels capable of being displayed by the display).

Generally, the electronic device 100 is capable of receiving input while operating in the intermediate or AoD mode. While operating in this mode, the electronic device 100, as mentioned previously, displays notifications to a user using substantially less than all pixels of the display. Typically, to exit the AoD mode and respond to a notification, a user must enter authentication credentials to bypass a screen lock. The authentication credentials may include, but are not limited to, an unlock pattern, a pin, a password, or fingerprint.

Beneficially, the present disclosure includes embodiments that allow a user to use his or her voice to respond to a notification without the use of the typical authentication credentials. In one embodiment, the components 200 of the electronic device 100 include a voice response module 233. The voice response module 233, briefly, is configured to enable context-based voice responses to AoD notifications without requiring a user to authenticate first himself or herself. A detailed explanation of the voice response module 233 will be given below with reference to FIG. 3. The voice response module 233 may be a separate hardware circuit, or in an alternative embodiment, an application functioning within the operating system that is executable from the memory 224.

It is to be understood that FIG. 2 is provided for illustrative purposes only and for illustrating components of an electronic device 100 in accordance with various embodiments of the present disclosure, and is not intended to be a complete schematic diagram of the various components required for an electronic device. Therefore, an electronic device can include various other components not shown in FIG. 2, or can include a combination of two or more components or a division of a particular component into two or more separate components, and still be within the scope of the disclosed embodiments.

Figure 3:
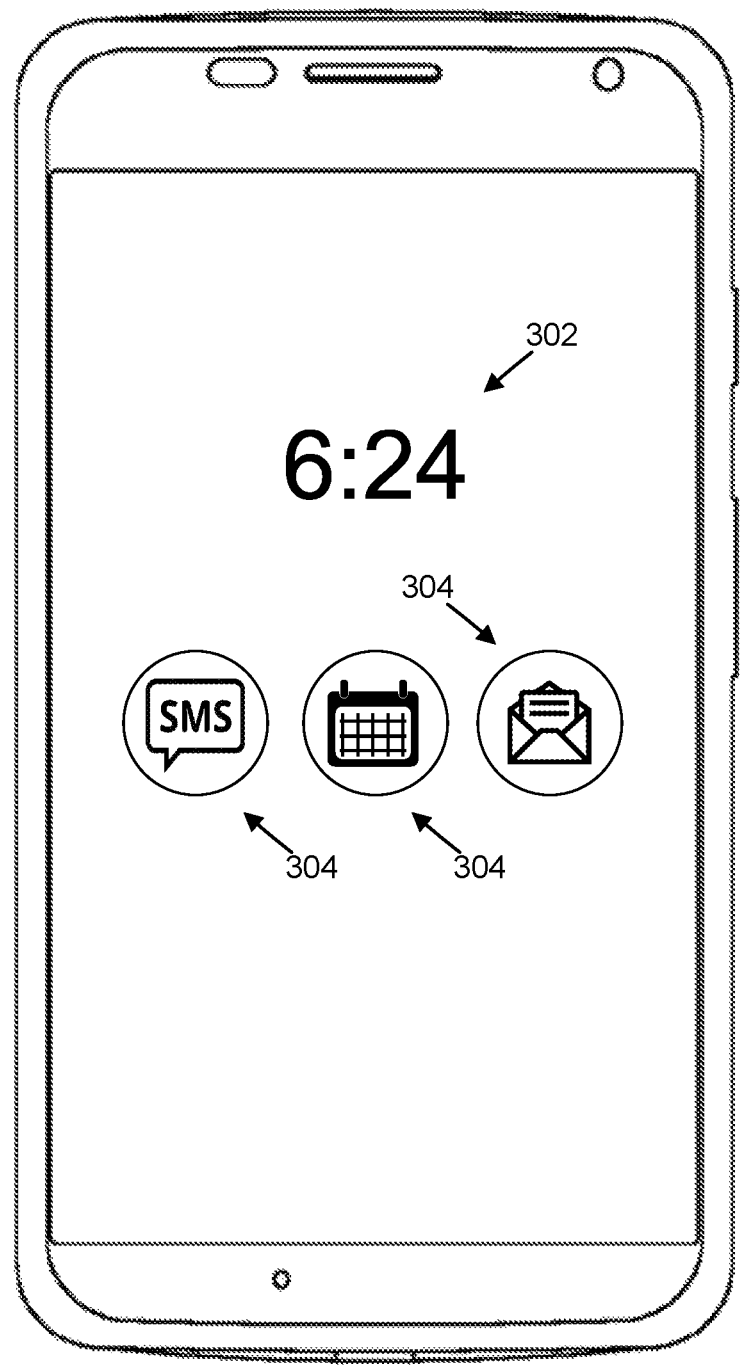
FIGS. 3, 4, and 5 are block diagrams illustrating embodiments of the electronic device display operating in the AoD mode in accordance with embodiments of the present disclosure.
Figure 4:
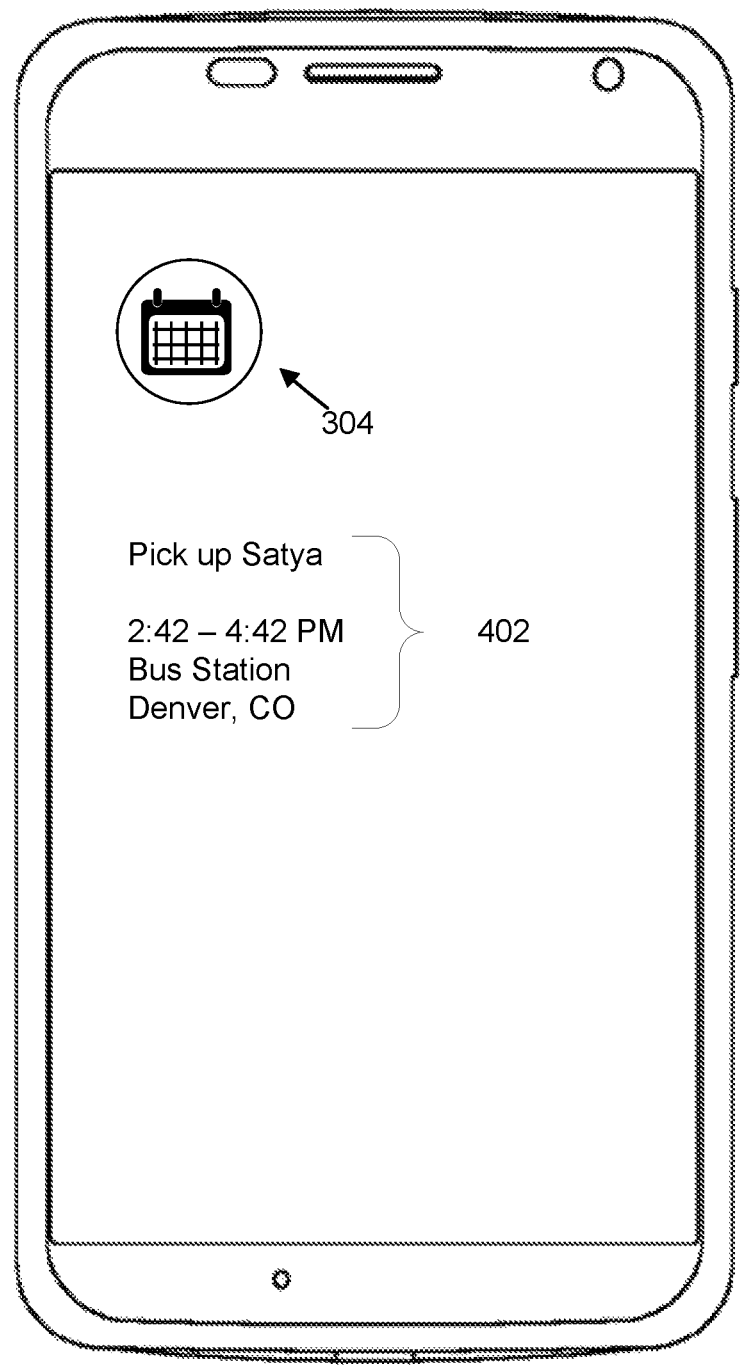
Figure 5:
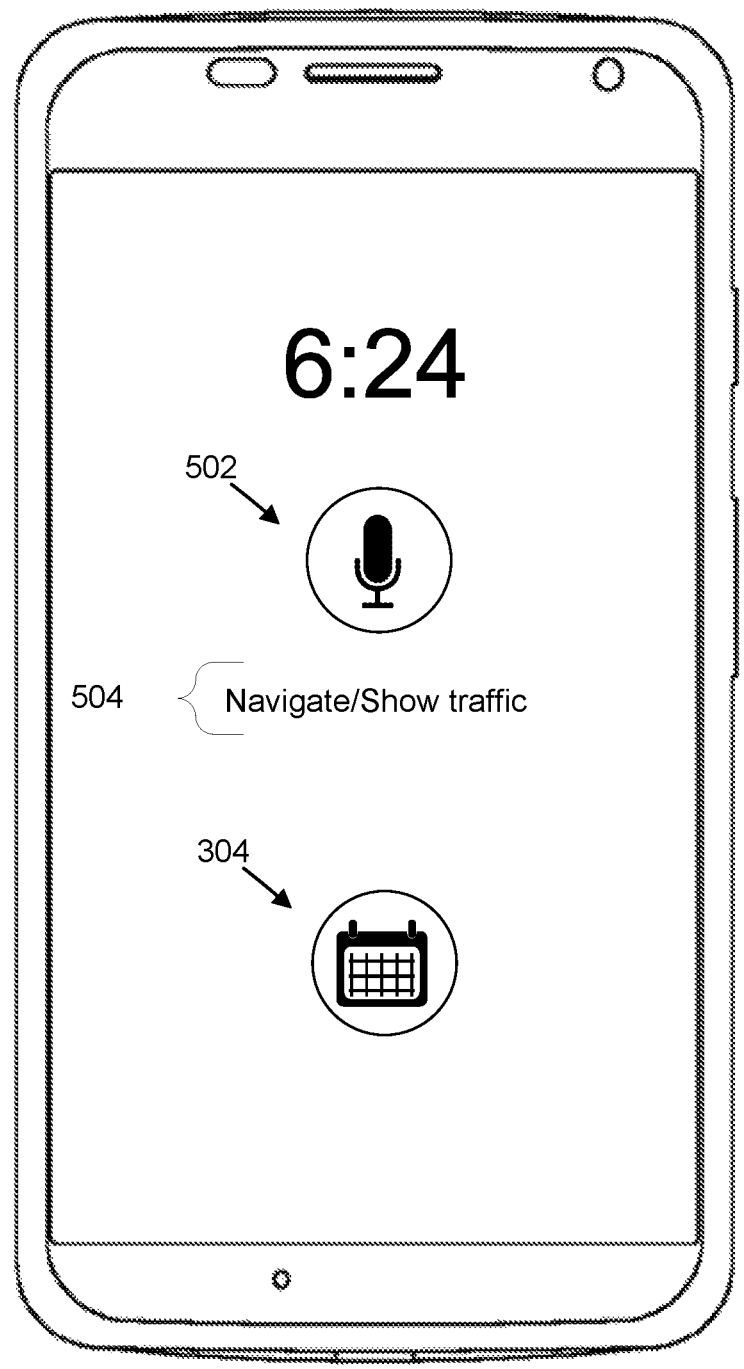

FIGS. 3, 4, and 5 are block diagrams illustrating embodiments of the electronic device 100 display operating in the AoD mode in accordance with embodiments of the present disclosure. As discussed previously, the electronic device 100 is capable of operating in a full-power mode, an intermediate-power mode, and a low-power mode. In the intermediate- or low-power modes, a substantial portion of the display 105 is deactivated to save power. The electronic device 100 is configured to display certain information while operating in a less-than-full-power mode (i.e., AoD mode), including, but not limited to, a time 302, a date, and notifications 304. Examples of notifications 304 that may be displayed in AoD mode include, but are not limited to, text (i.e., SMS) notifications, calendar notifications, email notifications, other messaging app notifications, etc. Stated differently, any application that is capable of providing notifications during a full-power mode of the electronic device 100 may also present a notification in AoD mode.

The electronic device 100 may be capable of displaying multiple notifications 304 simultaneously, as depicted in FIG. 3, while in AoD mode. Although the notifications 304 are depicted in a linear fashion in substantially the center of the display, it is contemplated that the notifications 304 may be positioned as desired by a user.

The electronic device 100, as discussed previously, is configured to receive input from the user via its various input devices (i.e., touch screen, buttons, etc.). The user may touch an icon indicative of the type of notification 304 that the user desires to review. FIG. 4 depicts an embodiment where a user has selected the calendar notification 304 from among the available notifications of FIG. 3. The electronic device 100, in one embodiment, is configured to display information 402 relevant to the notification. By way of an illustrative example only, FIG. 4 illustrates that the calendar notification 304 has information 402 associated with the notification. Upon selection of the calendar notification 304 in FIG. 3, the electronic device 100 displays the information 402. In a similar manner, the electronic device 100 may display the related information of any selected notification without bypassing a screen lock, and requiring authentication, to enter the full-powered mode.

As will be discussed in greater detail below, the voice response module 233 of the electronic device 100 is configured to enable voice command responses to notifications 304 presented while the electronic device 100 operates in AoD mode. FIG. 5 is one illustrative example of a voice-enabled response to the calendar notification. The voice response module 233 may display, in one embodiment, an icon 502 indicative of the ability of the electronic device to receive a voice command for a selected notification. For example, the voice response module 233 may present a microphone icon 504 to indicate that the electronic device 100 is capable of receiving a voice command for the calendar notification 304. Voice command suggestions 504 may also be presented. The voice response module 233 is configured to identify the type of selected notification (i.e., SMS, calendar, messaging, etc.) and present potential voice commands. In the depicted embodiment, a suggestion 504 to "navigate" is provided. Alternatively, a suggestion 504 for a calendar event may also include a prompt to dismiss/delete the calendar event or reschedule the calendar event. These suggestions 504 given here are by way of example only, as one skilled in the art will recognize that many potential voice-command suggestions 504 may be given here.

The voice-command suggestions 504, in one embodiment, are context based. In other words, the voice-command suggestions 504 are based on the type of notification selected, and the context of the notification. For example, if the selected notification were a text notification, the voice-command suggestion 504 may be "respond," "dismiss," etc. Additionally, if the notification contains, for example, a URL or a phone number, the voice-command suggestion 504 may include an option to open the URL in a browser or an option to call the phone number. Other voice-command suggestions 504 are contemplated.

Figure 6:
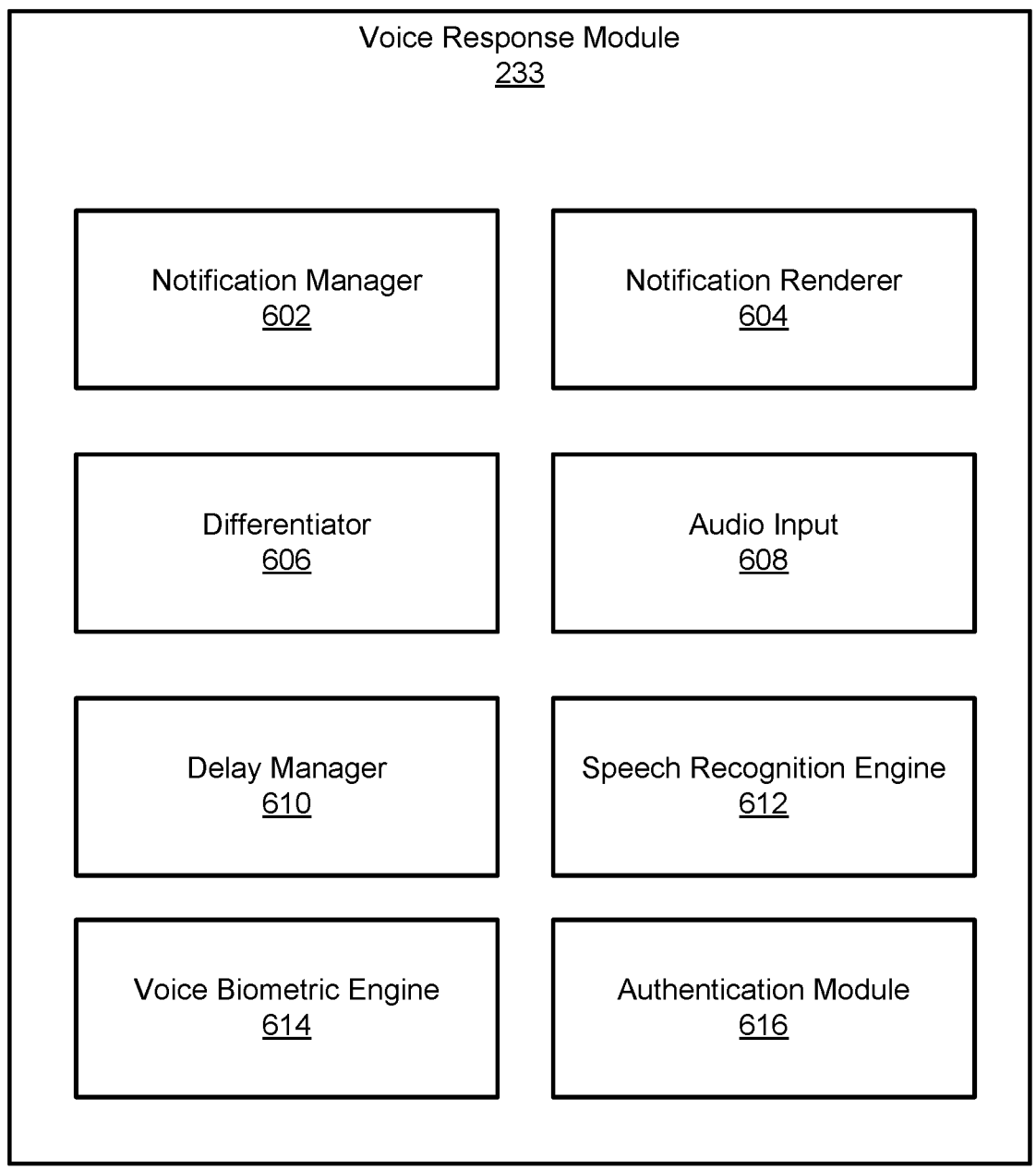
FIG. 6 is a schematic block diagram illustrating one embodiment of a voice response module in accordance with embodiments of the present disclosure.

FIG. 6 is a schematic block diagram illustrating one embodiment of a voice response module 233 in accordance with embodiments of the present disclosure. The voice response module 233, in one embodiment, includes a notification manager 602, a notification renderer 604, a differentiator 606, an audio input 608, a delay manager 610, a speech recognition engine 612, a voice biometric engine 614, and an authentication module 616.

The notification manager 602, in one embodiment, is configured to manage notifications received or self-generated while the electronic device is in the AoD mode. The notification manager 602 may track whether a notification 304 has been responded to, viewed, and/or dismissed. Additionally the notification manager 602 may be configured to maintain potential voice-command suggestions 504 that correspond to the notifications 304. For example, the notification manager 602 may be configured to maintain a list of potential voice commands for calendar notifications, a list of potential commands for SMS notifications, a list of potential commands for email notifications, etc.

In one embodiment, the notification manager 602 is configured to generate voice-command suggestions that are based on the context of the notification. These voice-command suggestions may include information from the notification, and be notification specific. For example, a voice-command suggestion to a text message may include "respond to sender," etc. The notification manager 602 may also be configured to detect which notification, from multiple notifications, is selected by the user, and restrict voice commands received from the user to the selected notification. In other words, if a user selects an instant messaging notification from among other notifications, the notification manager 602 is configured to apply the subsequent voice command to the selected notification. This beneficially allows a user to speak a response to a chat message without having to say "Respond to Tom," for example, because the notification manager 602 has already identified the sender of the selected notification.

In a further embodiment, the potential voice commands, or suggestions, may be provided to the notification manager 602 by a specific application. For example, a third party application may provide voice-command suggestions to the notification manager 602 that would otherwise be unknown to the notification manager 602 because these voice-command suggestions may be obscure or not commonly used.

The notification renderer 604 is configured to present or display, in one embodiment, the notifications 304 on the display of the electronic device 100 while the electronic device 100 is in AoD mode. The notification renderer 604 is configured to present the notifications according to a predetermined format, such as is displayed in FIG. 3. Alternatively, the notification renderer 604 may be configured to present the notifications according to a user preference. The user preference may request, for example, that the notifications 304 be positioned in a vertical, rather than horizontal, orientation. In another alternative embodiment, the notifications 304 may be scattered across the screen, according to user preference.

The differentiator 606, in one embodiment, parses the notifications 304 to identify a type of notification. For example, the differentiator 606 is configured to determine whether a notification is an email notification, calendar notification, SMS notification, etc. The differentiator 606 is also configured to parse the related information of the notification and determine a context of the notification. The suggested voice-commands may be based upon the determined notification type and context. In other words, the suggested voice-commands that are presented to the user may be based upon the type of the notification and the context of the related information. For example, a calendar event that includes a location may have "Navigate" as a suggested voice command, while a calendar event that does not include a location may have a different suggested voice command even though both of these examples are calendar events.

The audio input 608, in one embodiment, is a microphone sensor that communicates with the sensor hub 224 of FIG.

2. The audio input 608 is configured to detect and receive voice commands from the user. The audio input 608, in one embodiment, is constantly listening for a trigger phrase such as "Ok phone." Alternatively, the audio input 608 is only activated when instructed to do so by the voice response module 233. This beneficially, reduces power and memory consumption.

The delay manager 610 is configured to determine a delay time before turning on the audio input 608. The delay time allows the user to review the information related to the notification before the audio input 608 is activated. This delay time may begin once the user selects a notification. In one embodiment, the delay manager 610 determines a delay time based on the length (i.e., amount of text) that is related to the notification. For example, a delay time for a six-word text message will be shorter than a delay time for a thirty-word email. The difference between those two examples may be a matter of a second or two.

The speech recognition engine 612 is configured to extract, from a received voice command, text. Stated differently, the speech recognition engine 612 converts spoken language into written text that may then be used to execute the voice command. In a further embodiment, the speech recognition engine 612 may be configured to load context-specific grammar recognition patterns. For example, if the notification is a calendar-related notification, the speech recognition engine 612 is configured to load grammar recognition patterns related to calendar events, such as "how is the traffic," "navigate to . . . ", "book a cab," etc. Those of skill in the art will recognize that many different speech recognition engines 612 exist and may be utilized here with respect to the embodiments of the present disclosure.

The voice biometric engine 614 is configured to authenticate a user based on the speech of the user. Stated differently, the voice biometric engine 614 identifies a user based on the way the user speaks. The voice biometric engine 614 is configured to extract personal voice patterns to identify the user by just the voice. The vocal tract of a user is shaped by many physical traits of the user, including the shape of the larynx, mouth, and nose. Additionally, the voice biometric engine 614 may be trained to identify the user based on learned behavioral patterns (e.g., voice pitch, speaking style, etc.). These physical traits and patterns become part of the waveforms of the user's voice (i.e., voice print or voice model), and is difficult to change or disguise. The voice biometric engine 614 is configured to match a speaker to an authenticated user of the electronic device 100

The authentication module 616 is configured to bypass the screen lock in response to a positive match of the voiceprint of the speaker. The screen lock may also be referred to as a "firewall" that protects the electronic device 100 from unauthorized access. The authentication module 616 allows the execution of a voice command in response to a positive voice print match by the voice biometric engine 614. The authentication module 616 may also bypass the screen lock in response to the user successfully entering a password, PIN, etc.

Figure 7:
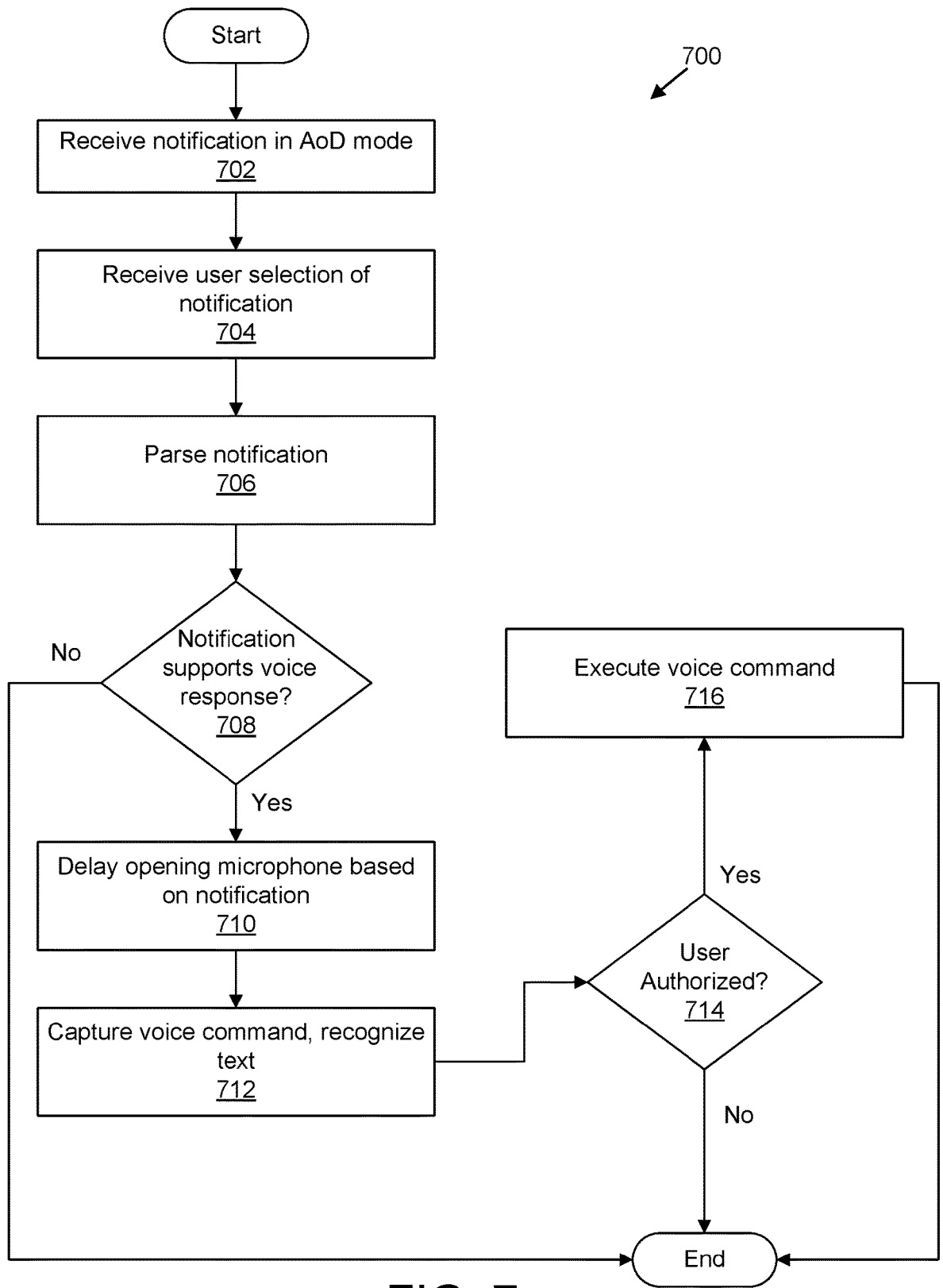
FIG. 7 is a schematic flowchart diagram illustrating one embodiment of a method for enabling voice-command responses to notifications in an AoD environment in accordance with embodiments of the present disclosure.

FIG. 7 is a schematic flowchart diagram illustrating one embodiment of a method 700 for enabling voice-command responses to notifications in an AoD environment in accordance with embodiments of the present disclosure. The method 700 is performed by processing logic that may comprise hardware (circuitry, dedicated logic, etc.), software (such as is run on a general-purpose computing system or a dedicated machine), or a combination of both. In one embodiment, the voice response module 233 performs the method 700. Alternatively, other components of electronic device 100 perform some or all of the method 700.

In one embodiment, the processing logic starts the method 700 and, at block 702, receives a notification in AoD mode. The processing logic may present the notification to the user, or render this new notification alongside other notifications that have already been received and/or generated, but not yet reviewed or dismissed.

In one embodiment, the processing logic, at block 704, receives a user selection of a notification. In one embodiment, the processing logic receives a user selection by receiving input indicative of a selection, including for example, but not limited to, a touch on a screen that selects a notification, potentially from amongst a group of notifications. At block 706, the processing logic parses the notification to determine a notification type and the context of the information related to the notification.

At decision block 708, the processing logic determines if the now identified notification type supports a voice response. In one example, the processing logic maintains a table of notification types and corresponding enabled voice responses, and the processing logic determines if the notification matches one of the notification types in the table. If the decision is "yes", the processing logic, at block 710, determines a delay time based on the length of the information related to the notification, and delays opening the microphone (i.e., audio input) according to the delay time.

At block 712, the processing logic captures the voice command and recognizes the text of the command. At decision block 714, the processing logic determines if the speaker of the voice command is an authorized user of the electronic device 100. If yes, the processing logic, at block 716, bypasses a screen lock, causes the electronic device to enter a full-power mode, and executes the command and the method 700 ends. In an alternative embodiment, the processing logic returns the electronic device 100 to an AoD mode following the execution of the voice command. In yet another alternative embodiment, the processing logic keeps the electronic device in a full power mode following the execution of the voice command. If at either decision block 708 or 714 the answer is "no," the method 700 ends.

Embodiments may be practiced in other specific forms. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus comprising:
a display configured to switch between a full power mode and an Always on Display ("AoD") mode;
a processor;
a memory that stores code executable by the processor configured to:
parse a notification, received while in the AoD mode, to determine a notification type;
determine if the notification type supports voice responses;
display the notification to a user via the display;
in response to a determination that the notification type supports voice responses, enable a voice input that receives a voice response to the notification from a user following a delay after the user acknowledges the notification, where the voice response comprises a voice print that is unique to the user, and where the delay is based on a quantity of text corresponding to the notification;

authenticate the user based on the voice print; and bypass a screen lock, in response to the user being authenticated, and execute a command based on the voice response to the notification.

2. The apparatus of claim 1, where the code is executable by the processor to present voice-command suggestions in response to one of either the determined notification type or a content of the notification.

3. The apparatus of claim 1, where the code is executable by the processor to execute the command in the full power mode.

4. The apparatus of claim 3, where the code is executable by the processor to return the display to the AoD mode following the execution of the voice command in the full power mode.

5. A method comprising:

switching between a full power mode and an Always on Display ("AoD") mode;

parsing, by a processor, a notification, received while in the AoD mode, to determine a notification type;

determining, by the processor, if the notification type supports voice responses;

displaying, via a display, the notification to a user;

in response to a determination that the notification type supports voice responses, enabling a voice input that receives a voice response to the notification from a user following a delay after the user acknowledges the notification, where the voice response comprises a voice print that is unique to the user, and where the delay is based on a quantity of text corresponding to the notification;

authenticating the user based on the voice print; and bypassing a screen lock, in response to the user being authenticated, and executing a command based on the voice response to the notification.

6. The method of claim 5, further comprising presenting voice-command suggestions in response to one of either the determined notification type or a content of the notification.

7. The method of claim 5, further comprising executing the command in the full power mode.

8. The method of claim 7, further comprising returning the display to the AoD mode following the execution of the voice command in the full power mode.

9. A computer storage device that stores computer-executable instructions that, when executed by a processor of a computing device that includes a memory, cause the computing device to perform actions comprising:

switching between a full power mode and an Always on Display ("AoD") mode;

parsing a notification, received while in the AoD mode, to determine a notification type;

determining if the notification type supports voice responses;

displaying the notification to a user via a display;

in response to a determination that the notification type supports voice responses, enabling a voice input that receives a voice response to the notification from a user following a delay after the user acknowledges the notification, where the voice response comprises a voice print that is unique to the user, and where the delay is based on a quantity of text corresponding to the notification;

authenticating the user based on the voice print; and bypassing a screen lock, in response to the user being authenticated, and executing a command based on the voice response to the notification.

10. The computer storage device of claim 9, where the actions further comprise presenting voice-command suggestions in response to one of the determined notification type or a content of the notification.

* * * * *